United States Patent

Cormier

[11] 3,898,733
[45] Aug. 12, 1975

[54] CABLE STRIPPER

[76] Inventor: Joseph Tilmon Cormier, 1130 Main St., Tewksbury, Mass., 01876

[22] Filed: Aug. 5, 1974

[21] Appl. No.: 494,560

[52] U.S. Cl. .................................... 30/90.4; 30/294
[51] Int. Cl.² .................... B21F 13/00; B26B 29/02
[58] Field of Search .................... 30/90.4, 289, 294

[56] References Cited
UNITED STATES PATENTS

| | | | |
|---|---|---|---|
| 1,129,310 | 2/1915 | Platt | 30/90.4 X |
| 1,739,972 | 12/1929 | Klinger | 30/90.4 |
| 2,329,805 | 9/1943 | Wilson | 30/90.4 |
| 2,654,941 | 10/1953 | Schleimer | 30/90.3 |
| 3,453,917 | 7/1969 | Perry | 83/924 X |
| 3,624,901 | 12/1971 | Pettit et al. | 30/90.4 |

Primary Examiner—Al Lawrence Smith
Assistant Examiner—J. T. Zatarga
Attorney, Agent, or Firm—Charles R. Fay

[57] ABSTRACT

A knife having a cutting edge and a terminal sharp stripping point, there being a handle on the blade, and a cable guide mounted on the blade in fixed position thereon, although it may be adjustable. The guide comprises a pair of oppositely extending curved members which embrace and guide the cable, the stripping point extending very slightly into the guideway but sufficiently so that it can strip cable pulled through the guideway.

6 Claims, 7 Drawing Figures

CABLE STRIPPER

BACKGROUND OF THE INVENTION

The usual manner of stripping wires on the job is with a jacknife and this is of course a relatively dangerous procedure. Insulation cutters and strippers have been proposed but they have always been open to certain objections. In most of these devices it is necessary to use a separate knife to cut off the unwanted insulation and in some cases the devices are also somewhat dangerous to use and in general are unhandy to operate, particularly on the job.

SUMMARY OF THE INVENTION

In the present case a conventional flat, single cutting edge blade having a handle is utilized with certain small modifications as to the stripping point at the free end of the blade which is preferably cut back to some extent so that a point is provided which is in line with the cutting edge of the blade. A very simple guide is applied to this stripping point and it comprises members at each side of the blade which curve outwardly and then extend parallel to the blade in separated condition, or even slightly trending inwardly at their edges to help hold and guide the cable being stripped. In all cases the guide is held in fixed relation relative to the stripping point, but in one modification it can be adjusted so as to present more or less of the stripping point to the cable.

The device is very easy to use because the thumb can hold the Romex or other cable which is to be stripped and with the other hand the cable is merely slid through the guide, the point of the knife stripping the insulation to the desired extent, after which the sharp edge of the knive blade can be used to cut off the unwanted insulation. The present device is extremely simple and inexpensive and can utilize an already existing knife with slight modifications to the blade thereof.

PREFERRED EMBODIMENT OF THE INVENTION

Figure 1:
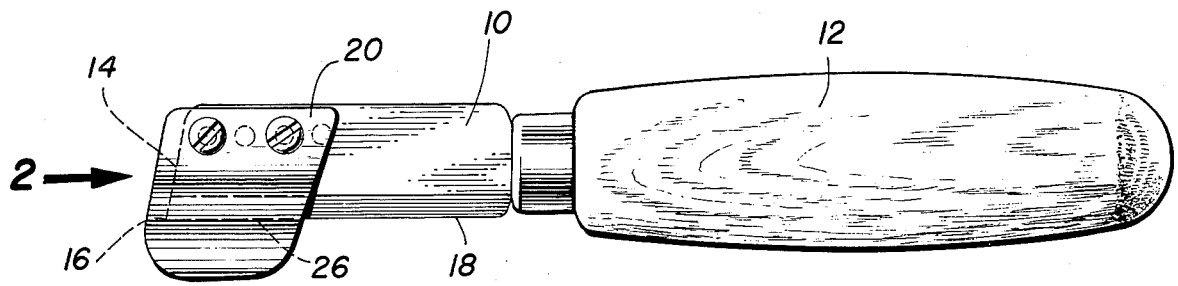
FIG. 1 is a view in side elevation illustrating one form of the invention.
Figure 2:
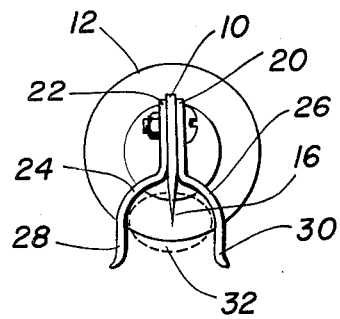
FIG. 2 is an end view thereof looking in the direction of arrow 2 in FIG. 1.
Figure 4:
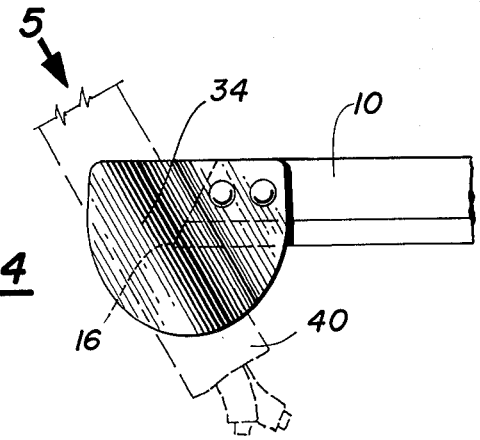
FIG. 4 shows a still further modification.

As shown in FIGS. 1 and 2, an ordinary straight flat knife blade 10 is mounted in a handle 12 in extension of the blade. The blade is preferably although not necessarily cut off on an angle as shown in FIG. 1 at 14 providing a cable stripping point 16 at the extreme end of the cutting edge 18 of blade 10.

A guide for the cable is then applied to the blade 10 and this guide covers point 16 approximately as is shown in FIG. 1. The guide comprises a pair of plates 20 and 22, see FIG. 2, which may be permanently secured to the blade 10 by welding or by riveting. It is preferred that a single rivet be used but a plurality may be utilized if this should be found desirable and also the plates 20 and 22 could of course be a single plate bent over on itself so as to be attached at both sides of blade 10.

The plates 20 and 22 are generally flat in the areas attached to the blade but then they extend forwardly and outwardly, i.e., apart, see 24, 26, terminating in portions 28 and 30 which are generally parallel to each other or which can be formed slightly inwardly toward each other so as to better hold the cable 32 and guide it relative to the cable stripping point 16. This point is arranged to extend slightly into the bottom of the guide which is formed by the portions 24 and 26 where they merge into portions 22 and 20.

Figure 3:
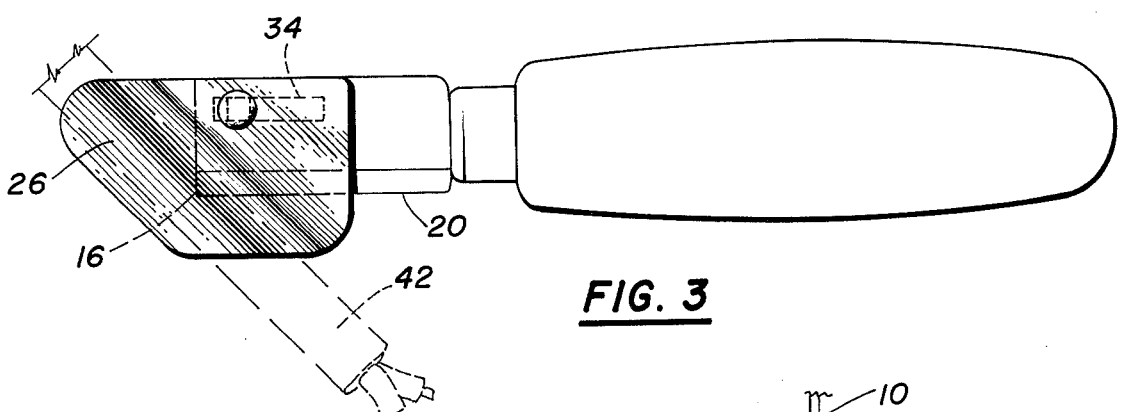
FIG. 3 is a view similar to FIG. 1 showing a modification.

The position of the point 16 relative to the bottom of the guide may be adjustable merely by forming a slot 34 in the blade, see FIG. 3, and utilizing a pair of bolts or rivets connecting the guide to the knife blade. If desired, a single bolt with a square shank or a square headed bolt may be utilized but the point is that in all cases the guide is held fixed relative to the cutting blade 10 even though it may be desired to make it adjustable. If it is made adjustable as in FIG. 3, it is securely clamped in the desired position.

It will be seen that adjusting the guide in FIG. 3 relative to the point 16 will cause the point 16 to extend further into the guide.

If Romex is being stripped it will appear approximately as shown in dotted lines 32 in FIG. 2. If entrance cable is to be stripped however, the cable would be placed in the guide at ninety degrees with respect to the showing at 32 in FIG. 2. Twisted cable can also be stripped as it is very easy to allow the stripper to follow the twist and thereby strip parallel to the twisted wires that are to be bared.

In any event after the cable has been stripped it is cut off with the cutting edge 18 of the same tool utilized for the stripping operation.

Figure 5:
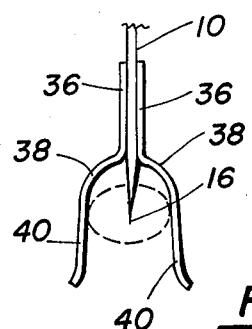
FIG. 5 is a view looking in the direction of arrow 5 in FIG. 4.

The modification shown in FIG. 5 shows a knife blade as before at 10 and a stripping point as before at 16 but in this case the guide is formed to lie at a considerable angle as is illustrated at 34. This guide is generally the same as before having flat areas 36, 36 attached to blade 10' and turning outwardly as at 38, 38. It will be seen however that the angle at which the cable 32 lies with respect to the point 16 is increased over the relatively slight angle shown in FIGS. 1 and 3. The point 16' extends into the bottom of the guide almost at right angles with respect thereto whereas the slitting point 16 in FIGS. 1 and 2 is almost parallel with respect to the cable being stripped. It is pointed out that the guide can be inclined to such an extent that the cable is slit along an angle which is indicated in broken lines at 42 in FIG. 3. Any angle can be utilized and as a matter of fact the cable can be stripped almost parallel to the cutting edge 18; this depending upon the degree to which the guide elements 24 and 26 are formed with relation to the longitudinal axis of the blade 10.

The cable stripper described is extremely easy and quick to use. The cable is inserted in the guide, the operator's thumb is placed on the cable, and the knife is then rapidly pulled with respect to the cable toward the free end thereof, whereupon the unwanted cable insulation is cut off with the knife blade.

Figure 6:
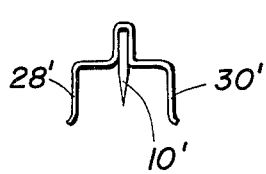
FIGS. 6 and 7 illustrate modifications.
Figure 7:
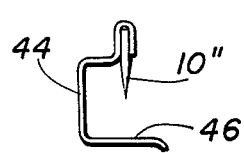

FIG. 6 illustrates a modification in which the portions 28' and 30' are more squarely formed but the relation to point 10' is as before. FIG. 7 illustrates a form of the invention wherein a single plate 44 extends laterally from point 10'', thence parallel to the blade past the point, the thence reversely laterally past the point. In this case the device guides at one side and the bottom of the cable rather than at both sides.

I claim:

1. A cable stripper comprising a straight edged blade having a handle at one end, the blade having a longitudinally extending straight cutting edge and a free end forming a generally square stripping point with the cutting edge of the blade, and a cable guide mounted in fixed relation on said blade, the guide comprising a pair of plates one at either side of the blade covering the stripping point, said plates each being provided with a flat portion secured to the blade and extending outwardly away from each other in the region of the stripping point, terminating in terminal portions which are substantially parallel to each other, the stripping point projecting from the bottom of the guide at a point where the outwardly extending portions merge with the flat portions attached to the blade, said stripping point being wholly within the guide.

2. The cable stripper of claim 1 wherein the guide is permanently attached with respect to the blade.

3. The cable stripper of claim 1 wherein the guide is adjustable with respect to the stripping point in a direction parallel to the longitudinal axis of the straight cutting blade.

4. The cable stripper of claim 1 wherein the portion of the guide plates that extend away from each other forming the cable guide are arranged at an angle with respect to the cutting edge of the knife blade.

5. The cable stripper of claim 1 wherein the cable guide is substantially parallel to the straight edge.

6. The cable stripper of claim 1 wherein the cable guide is at an angle relative to the straight edge.

* * * * *